United States Patent
Sugahara

(10) Patent No.: US 12,456,188 B2
(45) Date of Patent: Oct. 28, 2025

(54) RADIOGRAPHY APPARATUS AND RADIOGRAPHY SYSTEM

(71) Applicant: FUJIFILM Corporation, Tokyo (JP)

(72) Inventor: Masataka Sugahara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 525 days.

(21) Appl. No.: 17/496,780

(22) Filed: Oct. 8, 2021

(65) Prior Publication Data

US 2022/0028075 A1    Jan. 27, 2022

Related U.S. Application Data

(63) Continuation of application No. PCT/JP2020/015839, filed on Apr. 8, 2020.

(30) Foreign Application Priority Data

Apr. 11, 2019  (JP) ................................. 2019-075864
Nov. 7, 2019   (JP) ................................. 2019-202358

(51) Int. Cl.
  *G06T 7/00*   (2017.01)
  *A61B 6/46*   (2024.01)
  *G16H 30/20*  (2018.01)

(52) U.S. Cl.
  CPC ............ *G06T 7/0012* (2013.01); *A61B 6/461* (2013.01); *G16H 30/20* (2018.01);
  (Continued)

(58) Field of Classification Search
  CPC ......... G06T 7/0012; G06T 2207/10116; G06T 2207/20081; G06T 2207/30004;
  (Continued)

(56) References Cited

U.S. PATENT DOCUMENTS 6,115,489 A * 9/2000 Gupta ................... G16H 50/70
                                                382/152
9,615,810 B2  4/2017 Matsuno
(Continued)

FOREIGN PATENT DOCUMENTS

JP    2007044272    2/2007
JP    2008264231    11/2008
(Continued)

OTHER PUBLICATIONS

"International Search Report (Form PCT/ISA/210) of PCT/JP2020/015839," mailed on Jun. 23, 2020, with English translation thereof, pp. 1-6.
(Continued)

*Primary Examiner* — Dhaval V Patel
(74) *Attorney, Agent, or Firm* — JCIPRNET

(57) ABSTRACT

The radiography apparatus includes a radiation source that generates radiation, a radiography unit, a display, and a processor. The processor images an object using radiation, analyzes a radiographic image to determine the radiographic image, whose capture is determined to have failed, to be a failure and to decide an imaging failure reason, which is a reason for the determination, and correction information for eliminating the imaging failure reason, and displays the correction information on the display. The radiography system includes the radiography apparatus.

13 Claims, 16 Drawing Sheets

(52) U.S. Cl.
CPC .............. *G06T 2207/10116* (2013.01); *G06T 2207/20081* (2013.01); *G06T 2207/30004* (2013.01)

(58) Field of Classification Search
CPC .......... A61B 6/461; A61B 6/586; A61B 6/04; A61B 6/5294; A61B 6/54; A61B 6/465; G16H 30/20; G16H 50/20; G16H 40/63; G16H 30/40; G16H 50/70
See application file for complete search history.

(56) References Cited

U.S. PATENT DOCUMENTS

| | | | |
|---|---|---|---|
| 9,750,478 | B2 | 9/2017 | Matsuno |
| 10,285,663 | B2 * | 5/2019 | Lalena .................... A61B 6/582 |
| 2007/0036268 | A1 | 2/2007 | Matsuno |
| 2009/0074273 | A1 * | 3/2009 | Fischer .................. G16H 40/67 382/128 |
| 2010/0145231 | A1 | 6/2010 | Takahashi et al. |
| 2016/0089105 | A1 | 3/2016 | Park |
| 2017/0238892 | A1 * | 8/2017 | Taneda .................. A61B 6/467 |
| 2017/0296135 | A1 | 10/2017 | Arima |
| 2017/0311920 | A1 * | 11/2017 | Hiroshige ............ A61B 6/4405 |
| 2018/0164467 | A1 * | 6/2018 | Nikol ....................... G06T 5/50 |
| 2019/0015056 | A1 * | 1/2019 | Sato ........................ A61B 6/487 |
| 2019/0076109 | A1 * | 3/2019 | Uehara ................... G01T 1/161 |
| 2019/0287241 | A1 * | 9/2019 | Hill ...................... A61B 6/5282 |

FOREIGN PATENT DOCUMENTS

| | | |
|---|---|---|
| JP | 2010253243 | 11/2010 |
| JP | 2015173804 | 10/2015 |
| JP | 2015195832 | 11/2015 |
| JP | 2017144075 | 8/2017 |
| JP | 2017192453 | 10/2017 |
| JP | 2017192509 | 10/2017 |
| JP | 2018202231 | 12/2018 |

OTHER PUBLICATIONS

"Written Opinion of the International Searching Authority (Form PCT/ISA/237)" of PCT/JP2020/015839, mailed on Jun. 23, 2020, with English translation thereof, pp. 1-10.

"Notice of Reasons for Refusal of Japan Counterpart Application", issued on Aug. 9, 2022, with English translation thereof, p. 1-p. 12.

"Search Report of Europe Counterpart Application", issued on Apr. 20, 2022, p. 1-p. 8.

"Office Action of China Counterpart Application", issued on Nov. 17, 2023, with English translation thereof, p. 1-p. 20.

"Second examination opinion notice of China Counterpart Application", issued on Aug. 2, 2024, with English translation thereof, pp. 1-14.

* cited by examiner

| ORDER ID | OD0001 |
|---|---|
| OBJECT ID | H0500 |
| IMAGING TECHNIQUE | CHEST/ DECUBITUS POSITION/ FRONT |

IMAGING ORDER

| IMAGING MENU | IRRADIATION CONDITIONS |
|---|---|
| CHEST/ DECUBITUS POSITION/ FRONT | TUBE VOLTAGE: 100 kV  TUBE CURRENT: 200 mA<br>IRRADIATION TIME: 20 ms |
| CHEST/ DECUBITUS POSITION/ REAR | TUBE VOLTAGE: 120 kV  TUBE CURRENT: 220 mA<br>IRRADIATION TIME: 25 ms |
| KNEE/ FLEXED POSITION/ SIDE | TUBE VOLTAGE: 50 kV  TUBE CURRENT: 150 mA<br>IRRADIATION TIME: 15 ms |

RADIOGRAPHY APPARATUS AND RADIOGRAPHY SYSTEM

CROSS-REFERENCE TO RELATED APPLICATIONS

This application is a Continuation of PCT International Application No. PCT/JP2020/015839 filed on 8 Apr. 2020, which claims priority under 35 U.S.C. § 119(a) to Japanese Patent Applications No. 2019-075864 filed on 11 Apr. 2019 and No. 2019-202358 filed on 7 Nov. 2019. The above application is hereby expressly incorporated by reference, in its entirety, into the present application.

BACKGROUND

1. Technical Field

The present disclosure relates to a radiography apparatus and a radiography system.

2. Description of the Related Art

In a medical field, radiographic images are widely captured by a radiography system. In radiography, imaging may fail due to, for example, an error in the positioning of a patient, the body movement of the patient, insufficient breathing, an error in the setting of imaging conditions, or the detection of a foreign matter (referred to as an imaging failure).

A radiology technician checks the captured radiographic image to determine the imaging failure. In a case in which the radiology technician determines that the image failure has occurred, re-imaging is performed in order to acquire a radiographic image required for diagnosis. In addition, even in a case in which the radiology technician does not determine that the image failure has occurred, the doctor may determine that the radiographic image is not suitable for a medical examination.

As described above, for example, in a case in which there is a difference between the determination criteria of the radiology technician for the imaging failure and the determination criteria of the doctor, who makes a diagnosis using radiographic images, for the imaging failure, re-imaging is required, and the time and effort required for re-examination increase. In addition, for example, the following problem occurs: in a case in which the radiographic image that does not need to be determined to be a failure is determined to be a failure, re-imaging that is originally unnecessary is performed, which is not preferable from the viewpoint of radiation exposure.

Therefore, the imaging failure is determined on the basis of predetermined criteria to reduce unnecessary imaging failures and to reduce re-examinations after an examination ends. As a result, it can be expected that the efficiency of the operation will be improved in medical facilities and that unnecessary radiation exposure and re-examinations for an object will be reduced.

For the determination of the imaging failure based on predetermined criteria, a specific radiography system is disclosed which performs regression analysis to detect image deterioration due to a position variation (JP2018-202231A). Further, for improving the efficiency of the re-examination operation, an imaging control device is disclosed which can perform re-imaging, without setting the imaging conditions again, in split imaging (JP2015-195832A).

SUMMARY

In a case in which it is determined that an imaging failure has occurred, re-imaging is performed after that. However, there is still a possibility that an imaging failure will occur in re-imaging. In a case in which an imaging failure occurs in re-imaging, the re-imaging is repeated again, which is not preferable in terms of an increase in the number of examinations and an increase in radiation exposure. Therefore, it is desirable to suppress the occurrence of an imaging failure in re-imaging in addition to the determination of the imaging failure based on predetermined criteria.

The present disclosure provides a radiography apparatus and a radiography system that determine an imaging failure on the basis of predetermined criteria and give advice for reducing the number of re-imaging operations.

The first aspect of the present disclosure is a radiography apparatus, and the radiography apparatus comprises a radiation source that generates radiation, a radiography unit, a display, and a processor. The radiography unit images an object using the radiation. The display displays a radiographic image obtained by the imaging. The processor analyzes the radiographic image to determine the radiographic image, whose capture is determined to have failed, to be a failure and to decide an imaging failure reason, which is a reason for the determination, and correction information for eliminating the imaging failure reason, and displays the correction information on the display.

Preferably, in a case in which the radiographic image is determined to be the failure, the processor displays, on the display, that the radiographic image has been determined to be the failure.

Preferably, the processor receives a correction information display instruction on whether or not to display the correction information on the display and displays the correction information on the display in response to the correction information display instruction.

Preferably, the processor receives an imaging failure reason display instruction on whether or not to display the imaging failure reason on the display and displays the imaging failure reason on the display in response to the imaging failure reason display instruction.

Preferably, the processor learns a radiographic image acquired in the past in advance and performs the analysis using a trained model that performs the determination.

Preferably, the processor accesses an imaging failure reason database, in which the imaging failure reason and the correction information have been registered in advance in association with each other, to decide the correction information for eliminating the imaging failure reason.

Preferably, the correction information is information including at least one of a character, a still image, or a moving image.

Preferably, the correction information is information including a sample image that has been successfully captured with respect to the radiographic image determined to be the failure.

Preferably, in a case in which the radiographic image is determined to be the failure, the processor receives whether or not a user approves the failure.

Further, the second aspect of the present disclosure is a radiography system, the radiography system comprises the above-described radiography apparatus. The radiography system is connected to a radiology information system that manages an imaging order.

Preferably, the radiography system is connected to a picture archiving and communication system that stores the radiographic image and information related to the radiographic image.

Preferably, in a case in which, in the radiography system, the processor receives the approval of the imaging failure for the radiographic image, the radiology information system registers a re-imaging order for the radiographic image approved as the failure.

Preferably, the radiography system further comprises an imaging failure management device that receives information including the radiographic image and the imaging failure reason in a case in which the processor receives the approval of the imaging failure for the radiographic image.

Preferably, in a case in which, in the radiography system, the processor receives the approval of the imaging failure for the radiographic image, the picture archiving and communication system receives the radiographic image and the information related to the radiographic image.

According to the above aspects, it is possible to provide a radiography apparatus and a radiography system that determine an imaging failure on the basis of predetermined criteria and give advice for reducing the number of re-imaging operations.

DESCRIPTION OF THE PREFERRED EMBODIMENTS

Figures 1, 2:
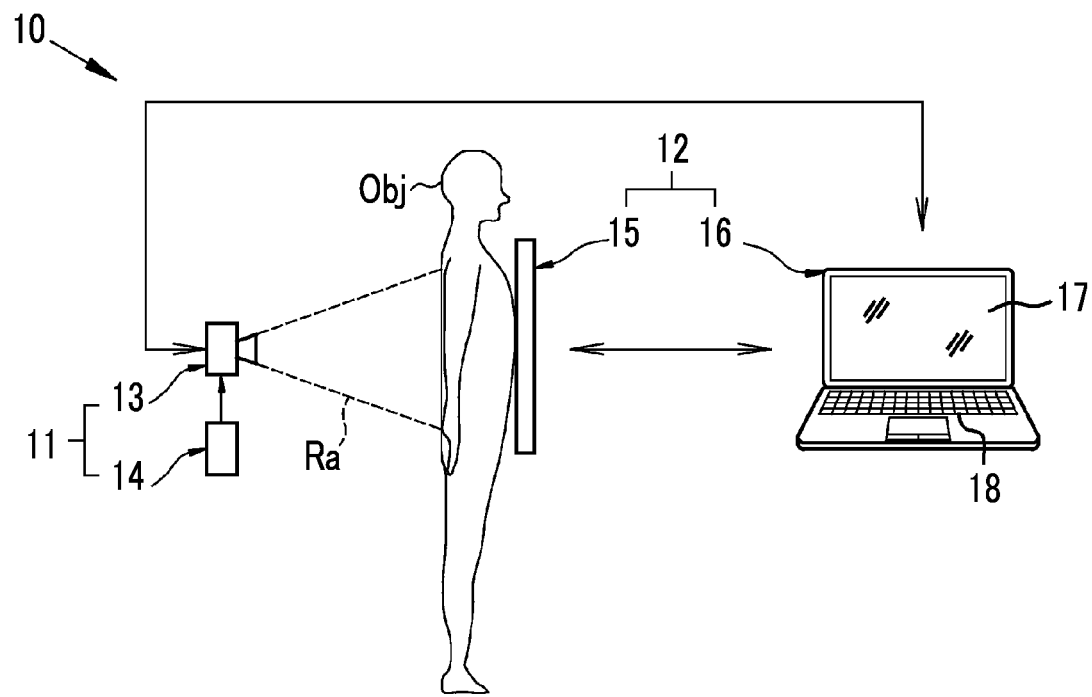
FIG. 1 is a diagram illustrating the outward appearance of a medical device system.
FIG. 2 is a diagram illustrating an imaging order.

As illustrated in FIG. 1, an X-ray imaging system 10 (radiography apparatus) that uses X-rays as radiation comprises an X-ray generation device (radiation generation device) 11 and an X-ray imaging device 12. The X-ray generation device 11 includes an X-ray source (radiation source) 13 and a radiation source control device 14. The radiation source generates radiation. The X-ray imaging device 12 includes an X-ray detection panel (radiography unit) 15 and a console 16.

In addition, the X-ray imaging system 10 includes, for example, an irradiation switch for inputting a radiation emission start instruction, a standing imaging table for imaging an object Obj in a standing posture, or a decubitus imaging table for imaging the object Obj in a decubitus posture. FIG. 1 illustrates an aspect in which the object Obj stands at a position facing the X-ray source 13 and is imaged in the standing posture in an imaging room in which the X-ray imaging system 10 is installed.

In addition, the X-ray imaging system 10 comprises, for example, an imaging failure management device that manages, for example, captured information. Further, the X-ray imaging system 10 is connected to an image server, such as a picture archiving and communication system (PACS) for medical application that manages a captured X-ray image, information related to the X-ray image, and the like, and an information management server, such as a hospital information system (HIS) or a radiology information system (RIS) that registers and manages information such as patient information, medical information, examination information, accounting information, and imaging orders for each patient.

The X-ray source 13 includes an X-ray tube that generates X-rays Ra, an irradiation field limiter that limits an irradiation field which is a region irradiated with the X-rays Ra, and an irradiation field display light source that emits irradiation field display light indicating the irradiation field. An optical camera may be attached to the X-ray source 13 in order to, for example, check the position of the object Obj.

The radiation source control device 14 includes a touch panel, a voltage generation unit, a control unit, and an irradiation switch. For example, the touch panel is operated to set the irradiation conditions of the X-rays Ra consisting of a tube voltage applied to the X-ray tube, a tube current, and the irradiation time of the X-rays Ra, and the size of an irradiation opening of the irradiation field limiter.

The voltage generation unit generates the tube voltage to be applied to the X-ray tube. The control unit controls the operation of the voltage generation unit to control the tube voltage, the tube current, and the irradiation time of the X-rays Ra. The control unit has a timer that starts timing in a case in which the X-rays Ra are generated from the X-ray tube and stops the operation of the X-ray tube in a case in which the time measured by the timer reaches the irradiation time set in the irradiation conditions. Further, the control unit operates the irradiation field limiter to set the size of the irradiation opening to the size set by the touch panel.

The irradiation switch is operated by an operator, such as a radiology technician who is a user of the X-ray imaging device, in a case in which the emission of the X-rays Ra is started. The irradiation switch is a two-stage push type. In a case in which the irradiation switch is pushed (half-pushed) to a first stage, the control unit directs the X-ray tube to start a preparatory operation before the X-rays Ra are generated. In a case in which the irradiation switch is pushed up to a second stage (fully pushed), the control unit directs the X-ray tube to generate the X-rays Ra. Then, the X-rays Ra are emitted toward a part of the object Obj to be imaged.

The X-ray detection panel 15 detects the X-rays Ra which have been emitted from the X-ray source 13 and transmitted through the object Obj for each pixel to acquire an X-ray image 30. The X-ray detection panel 15 has a wireless communication unit and a battery and operates wirelessly. The X-ray detection panel 15 wirelessly transmits the X-ray image 30 to the console 16. In addition, the X-ray detection panel 15 may perform wired communication.

The console 16 is configured by installing a control program, such as an operating system, or various application programs in a computer, such as a notebook personal computer, as a base. The console 16 has a display 17 and an input device 18 such as a touch pad or a keyboard. The display 17 displays the radiographic image obtained by imaging. The console 16 displays various operation screens having operation functions by a graphical user interface (GUI) on the display 17 and receives the input of various operation instructions by the operator from the input device 18 through the various operation screens.

The console 16 receives the input of an imaging order 21 illustrated in FIG. 2. The imaging order 21 is information for instructing the operator to perform X-ray imaging from an imaging requester such as a doctor in a clinical department. For example, the imaging order 21 is transmitted from the RIS to the console 16.

The imaging order 21 has items such as order identification data (ID), an object ID, and an imaging technique. The order ID is symbols or numbers for identifying each imaging order 21 and is automatically assigned by the RIS. The object ID of the object Obj to be imaged is described in the item of the object ID. The object ID is symbols or numbers for identifying each object Obj.

The imaging technique is information related to the part of the object Obj to be imaged and the posture and direction of the part to be imaged. Examples of the part to be imaged include a knee, a head, a cervical spine, a chest, an abdomen, a hand, a finger, and an elbow. The posture is the posture of the object Obj such as a standing posture, a decubitus posture, or a sitting posture, and the direction is the direction of the object Obj with respect to the X-ray source 13 such as the front, the side, or the rear. The imaging order 21 includes object information items, such as the name, sex, age, height, and weight of the object Obj, in addition to the above-mentioned items, which is not illustrated. In addition, the imaging order 21 includes the following items: the clinical department to which the imaging requester belongs; the ID of the imaging requester; the date and time when the imaging order 21 was received by the RIS; the purpose of imaging, such as postoperative follow-up or the effect determination of therapeutic agents; and matters to be handed over from the imaging requester to the operator.

Figures 3, 4:
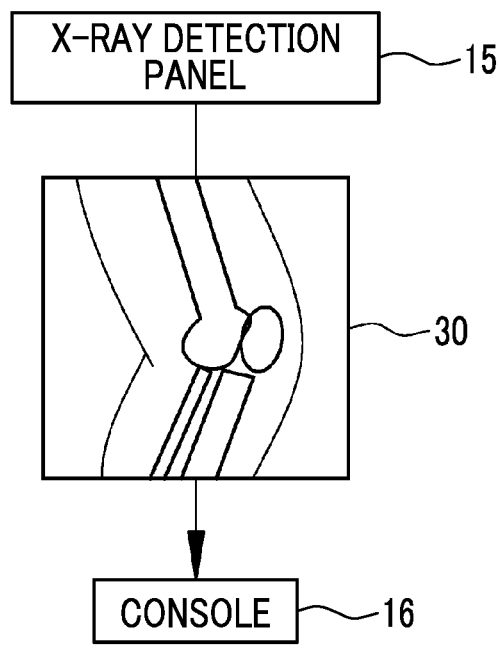
FIG. 3 is a diagram illustrating a menu/condition table.
FIG. 4 is a diagram illustrating the transmission of an X-ray image.

A menu/condition table 22 illustrated in FIG. 3 is stored in the console 16. In the menu/condition table 22, an imaging menu defining an imaging technique, in which the part to be imaged, the posture, and the direction constitute one set, and irradiation conditions corresponding to the imaging menu are registered so as to be association with each other. Sets of the imaging menu and the irradiation conditions include a set registered by default, sets obtained by the editing of the default set by the operator, and sets newly added separately from the default set. In addition, the imaging menu may not define the imaging technique, but may define only the part to be imaged.

The console 16 is operated by the operator to display an imaging order list obtained by listing the content of the imaging order 21 illustrated in FIG. 2 on the display 17. The operator browses the imaging order list and checks the content of the imaging order 21. Subsequently, the console 16 displays the content of the menu/condition table 22 illustrated in FIG. 3 on the display 17 in a form in which the imaging menu can be set. The operator selects an imaging menu matched with the imaging technique designated in the imaging order 21 and sets the imaging menu.

The console 16 wirelessly transmits, to the X-ray detection panel 15, the imaging menu set by the operator and condition setting signals including various kinds of information, such as the irradiation conditions, the order ID, and the console ID which is symbols or numbers for identifying the console 16, corresponding to the set imaging menu.

After setting the imaging conditions, the operator positions the X-ray source 13, the X-ray detection panel 15, and the object Obj at desired positions and drives the X-ray source 13 such that the X-rays Ra are emitted toward the object Obj. The X-ray detection panel 15 is irradiated with the X-rays Ra transmitted through the object Obj. In this way, the X-ray detection panel 15 detects the X-ray image 30.

As illustrated in FIG. 4, the X-ray detection panel 15 transmits the X-ray image 30 to the console 16. The console 16 displays the X-ray image 30 on the display 17 to show the X-ray image 30 to the operator. In FIG. 4, the part to be imaged in the X-ray image 30 is the knee.

Figure 5:
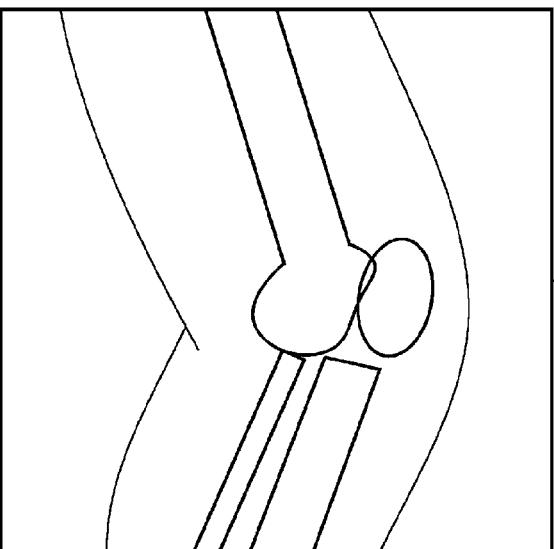
FIG. 5 is a diagram illustrating an image file.

For example, the console 16 converts the X-ray image 30 into an image file 31 in a format based on a Digital Imaging and Communication in Medicine (DICOM) standard illustrated in FIG. 5 and transmits the image file 31 to the PACS.

In the image file 31, the X-ray image 30 and accessory information 32 are associated with each other by one image ID. The accessory information 32 includes, for example, object information, the order ID, the imaging menu, and the irradiation conditions. The imaging requester can access the PACS with a client terminal and download the image file 31 to browse the X-ray image 30 with the client terminal.

Figure 6:
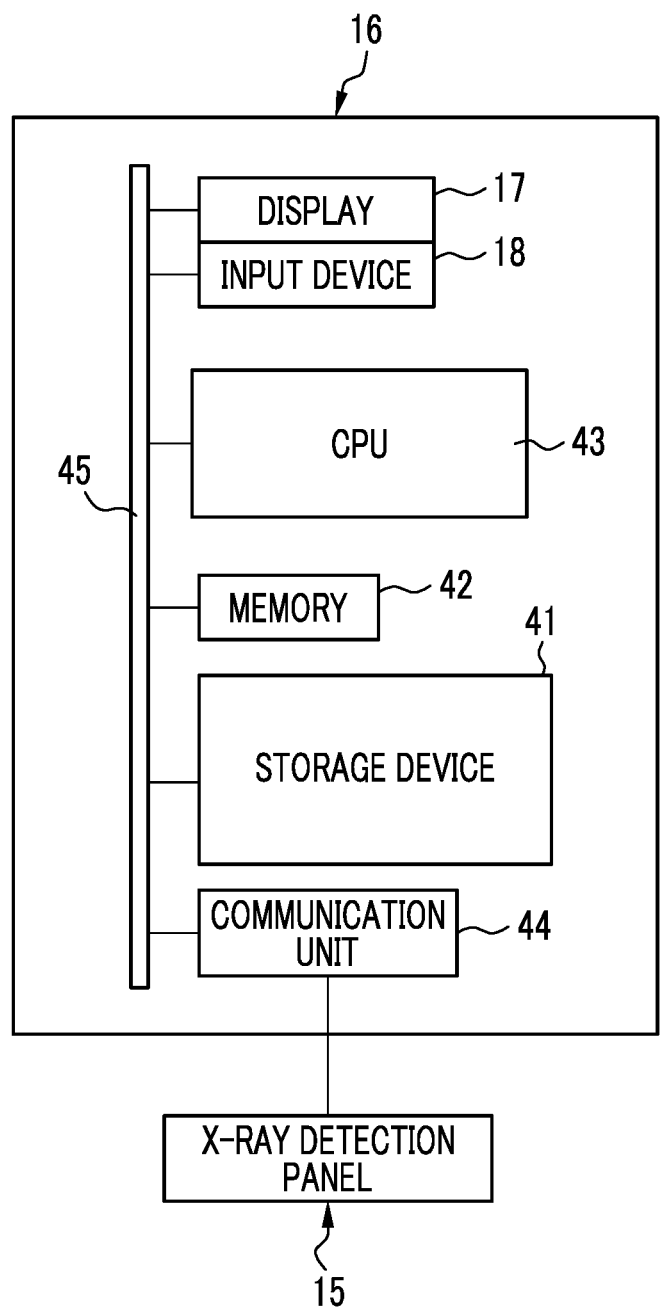
FIG. 6 is a block diagram illustrating the functions of a computer constituting a console.

In FIG. 6, the console 16 comprises a storage device 41, a memory 42, a central processing unit (CPU, a processor) 43, and a communication unit 44 in addition to the display 17 and the input device 18. These are connected to each other through a data bus 45.

The storage device 41 is a hard disk drive, which is provided in the console 16 or is connected to the console 16 through a cable or a network, or a disk array obtained by connecting a plurality of hard disk drives. The storage device 41 stores, for example, a control program, such as an operating system, various application programs, and various kinds of data associated with these programs.

The memory 42 is a work memory that is used by the CPU 43 to perform processes. The CPU 43 loads the program stored in the storage device 41 to the memory 42 and performs a process corresponding to the program to control the overall operation of each unit of the console 16. The communication unit 44 has a function of communicating with other devices or the network and takes charge of, for example, the communication of various kinds of data including the X-ray image 30 with the X-ray detection panel 15.

Figure 7:
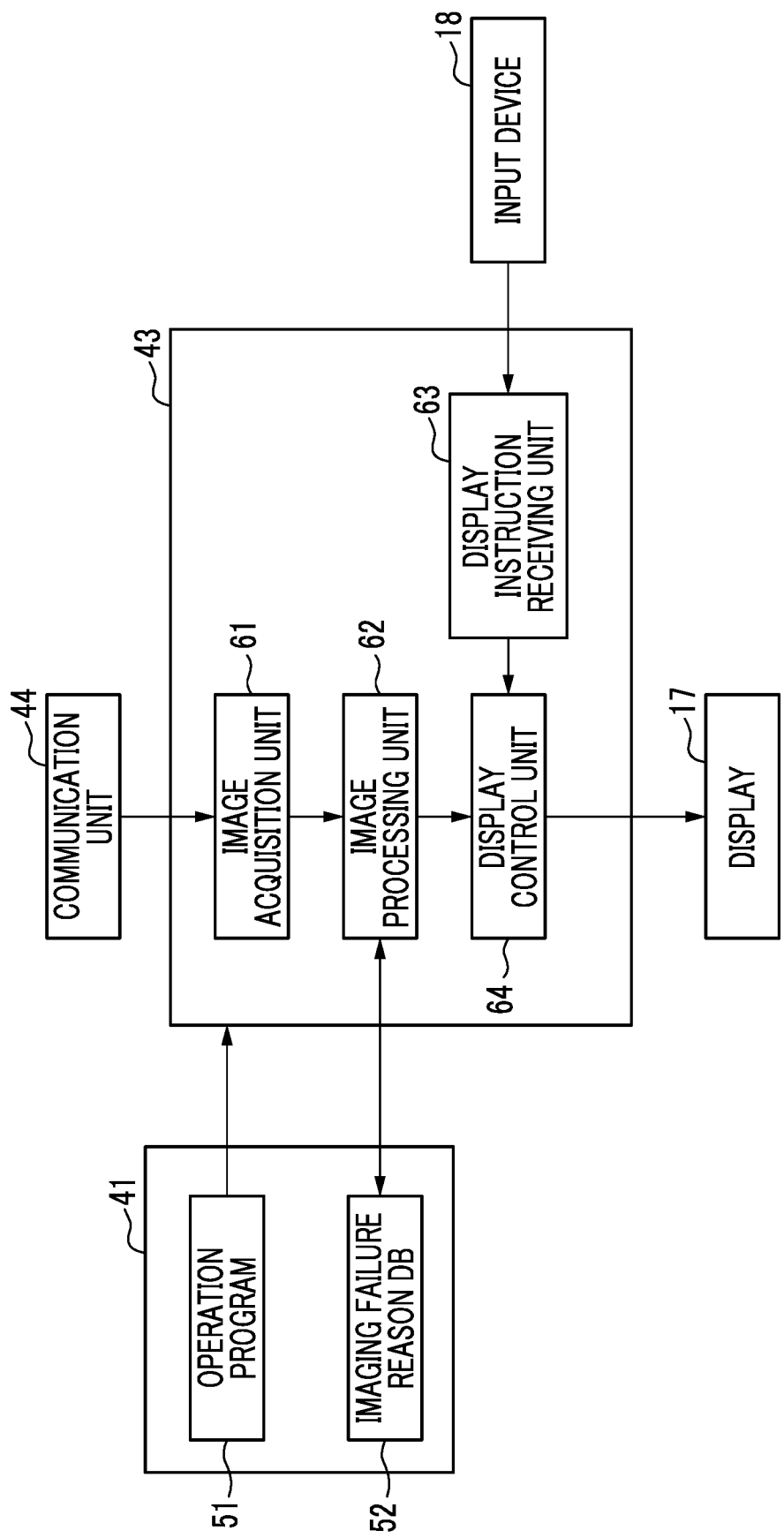
FIG. 7 is a block diagram illustrating the functions of a CPU of the console.

In FIG. 7, the storage device 41 stores an operation program 51 and an imaging failure reason database (hereinafter, abbreviated to DB) 52. The imaging failure reason DB 52 will be described below. In addition, the menu/condition table 22 illustrated in FIG. 3 is also stored in the storage device 41, which is not illustrated.

In a case in which the operation program 51 is started, the CPU 43 functions as, for example, an image acquisition unit 61, an image processing unit 62, a display instruction receiving unit 63, and a display control unit 64 in cooperation with the memory 42 and the like. Therefore, the X-ray imaging device 12 comprises the image acquisition unit 61, the image processing unit 62, the display instruction receiving unit 63, and the display control unit 64. The image acquisition unit 61 acquires the image, such as the X-ray image 30, received by the communication unit 44 for analysis. In general, the image acquisition unit 61 acquires all of the X-ray images 30 obtained by imaging and transmits each of the X-ray images 30 to the image processing unit 62.

Figure 8:
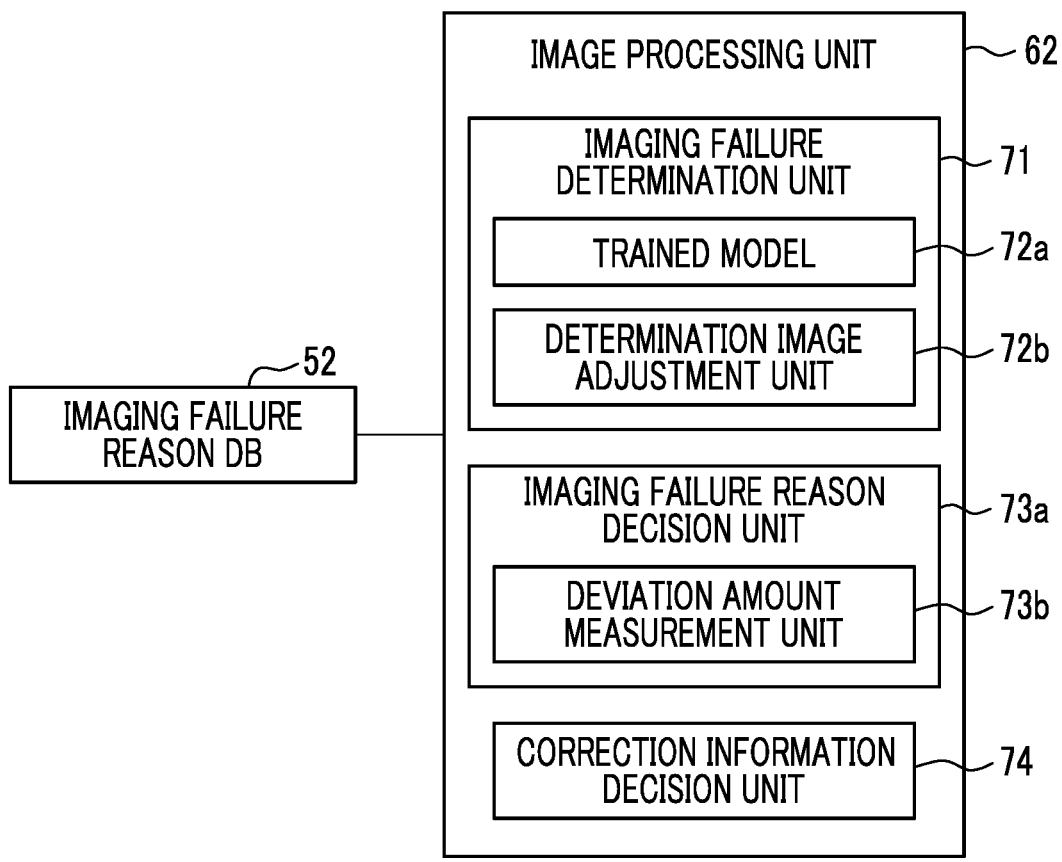
FIG. 8 is a block diagram illustrating the functions of an image processing unit.

As illustrated in FIG. 8, the image processing unit 62 comprises an imaging failure determination unit 71, an imaging failure reason decision unit 73a, and a correction information decision unit 74. The imaging failure determination unit 71 includes a trained model 72a and a determination image adjustment unit 72b. The image processing unit 62 analyzes the X-ray image 30 transmitted from the image acquisition unit 61. The analysis is performed in order to determine whether or not imaging has failed and to decide information related to an imaging failure reason which is the reason for determining that imaging has failed. Therefore, the image processing unit 62 analyzes the X-ray image 30 to determine the radiographic image, whose capture is determined to have failed, to be a failure and to decide the imaging failure reason, which is the reason for the determination, and correction information for eliminating the imaging failure reason.

The image processing unit 62 performs the determination for the X-ray image 30 using the trained model 72a that learns the X-ray image acquired in the past in advance and determines whether or not the capture of the X-ray image 30 has failed. Information indicating whether or not imaging has failed and information related to the reason in a case in which imaging has failed are output by this determination.

The use of the trained model 72a makes it possible to perform the determination on the basis of predetermined criteria. In addition, it is possible to obtain the determination result in a short time. For example, an algorithm or a library having a good determination result for image processing can be used as the trained model 72a. Further, an algorithm or a library having a good determination result for the X-ray image may be constructed and used. Furthermore, data obtained by giving at least information indicating whether imaging has failed to the X-ray image acquired in the past in advance is used as the learning data. In addition, data obtained by giving any information from, for example, imaging data which is accessory information related to the X-ray image or patient data to the X-ray image may be used. Further, a feature amount may be selected according to, for example, the type of the X-ray image, and data obtained by giving information of the feature amount to the X-ray image may be used.

In addition to the trained model 72a, other well-known machine learning techniques or image processing techniques other than the machine learning techniques may be used as long as they can perform the determination on the basis of predetermined criteria. Further, a plurality of image processing techniques other than the trained model 72a and the machine learning techniques may be provided, and preferable one of the processing techniques may be used depending on the type of a part of the X-ray image 30 and the like or the accuracy of the determination result and the like.

The determination criteria are set in advance. For example, the criteria are set strictly or loosely depending on the purpose of the X-ray image 30. Specifically, for example, the determination criteria can be set as follows: a threshold value is set in advance for the deviation of the drawing of a point portion in the X-ray image 30 in the determination of whether or not imaging has succeeded in accordance with the imaging menu; the threshold value is reduced to tighten the criteria; and the threshold value is increased to ease the criteria. Therefore, the desired determination criteria can be set according to the medical institution. In addition, different determination criteria may be set for each clinical department, such as an emergency department, an internal medicine department, or a surgery department, in the same medical institution, for each imaging region in the same internal medicine department, or for each purpose, such as an educational purpose for the determination criteria for the imaging failure by the operator.

In addition, the setting of the determination criteria may be changeable. The setting can be changed by, for example, the input device 18. Further, the image processing unit 62 may feed back, for example, the instructions received from the operator through the display instruction receiving unit 63 or an approval receiving unit 81, which will be described below, to change the setting. Furthermore, a setting unit (not illustrated) that is provided in the image processing unit 62 sets the determination criteria or changes the setting of the determination criteria. The setting unit has a function of performing various settings related to the image processing unit 62.

In addition, the trained model 72a can distinguish between an imaging failure and a non-imaging failure in order to determine whether the capture of the X-ray image 30 has failed. Therefore, it may be determined that imaging has not failed, that is, imaging has succeeded.

The determination image adjustment unit 72b adjusts the X-ray image 30 before the determination. The adjustment is performed in order to improve the accuracy of the determination. Therefore, examples of the content of the adjustment include trimming for selecting a portion of the X-ray image 30 as a region to be subjected to the determination, the deletion of an unnecessary region of the image, and/or the adjustment of brightness, saturation, or the like. In particular, in a case in which the trained model 72a using, for example, deep learning is used, correct analysis results may not be obtained due to incorrect classification for a region of the X-ray image 30 which is not related to the determination. It is preferable to avoid this. Therefore, in the adjustment of the X-ray image 30, preferably, trimming in which the operator or the like designates a region of the image to be subjected to the determination is performed to more accurately analyze the region to be subjected to the determination. In addition, the adjustment may not be performed.

Figure 9:
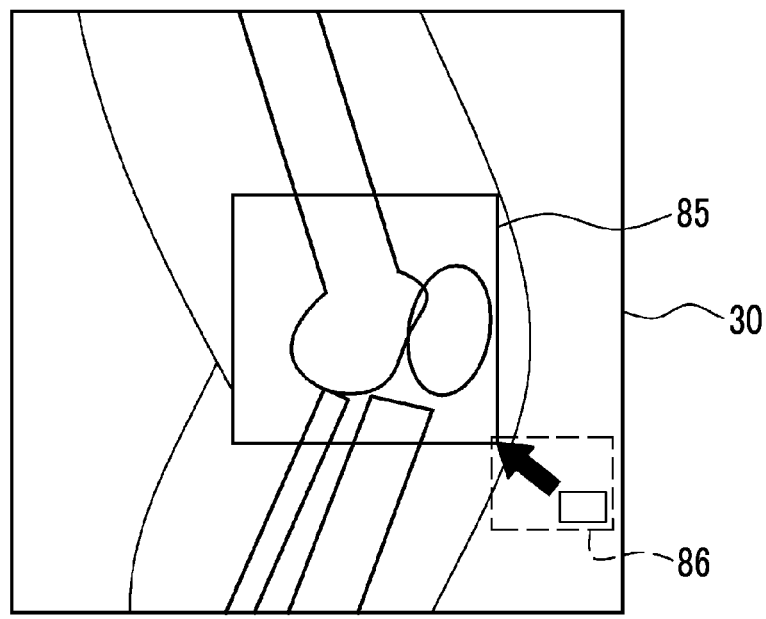
FIG. 9 is a diagram illustrating a frame and a region designation cursor.

As illustrated in FIG. 9, in a case in which the adjustment is performed by the trimming, the region to be subjected to the determination is selected by a frame 85 in the X-ray image 30 displayed on the display 17. The frame 85 is, for example, a rectangular frame and may be set automatically by an image recognition technique so as to include the region to be subjected to the determination. Alternatively, the operator may drag on the X-ray image 30 with a region designation cursor 86 to adjust the size of the frame 85, that is, the region of the X-ray image 30 to be subjected to the determination, thereby setting the frame 85. The determination image adjustment unit 72b adjusts the X-ray image 30 using the trimming that selects the region to be subjected to the determination using the frame 85, which makes it possible to, for example, determine the imaging failure for the knee joint illustrated in FIG. 9 with higher accuracy.

The imaging failure reason decision unit 73a decides the imaging failure reason on the basis of the information output by the trained model 72a in the determination. The imaging failure reason decision unit 73a includes a deviation amount measurement unit 73b. The information output by the trained model 72a in the determination is information related to the reason for the trained model 72a to determine that the imaging has failed. Examples of the reason include items, such as an error in the positioning of a patient, the body movement of the patient, insufficient breathing, an error in the setting of the imaging conditions, and the detection of foreign matters including a body warmer and a necklace.

In addition to the item of information related to the reason for determining that the imaging has failed, the imaging failure reason may include information related to the item. For example, the imaging failure reason includes an item indicating that an error in the positioning of the patient has occurred and information related to where and how much the position deviates. The deviation amount measurement unit 73b outputs information related to the position where the deviation has occurred and the amount of deviation on the basis of the information output by the trained model 72a and the image analysis technique for the X-ray image 30 determined to be a failure. In addition, the imaging failure reason may include an explanation for a portion whose imaging has failed, a portion whose imaging has not failed, and the like. Therefore, the imaging failure reason may include information related to a portion whose imaging is determined to have failed and information related to a portion whose imaging is determined to have succeeded. For example, a detailed imaging failure reason, such as the reason that the angle at which the knee is bent in a height direction of the patient is correct, but the internal rotation of the knee is insufficient in the error in the positioning of the patient, may be used.

The correction information is information indicating advice for reducing the number of re-imaging operations. Therefore, preferably, the correction information is information indicating advice for successfully capturing an image using one re-imaging operation. The correction information is information indicating the comparison between a sample image, which is the past X-ray image having the same portion and imaging data as the X-ray image 30 determined to be a failure and was successfully captured, and the X-ray image 30 determined to be a failure. As described above, the imaging failure reason and/or the correction information includes advice for reducing the number of re-imaging operations.

The correction information decision unit 74 accesses the imaging failure reason DB 52 and decides the correction information for eliminating the imaging failure reason decided by the imaging failure reason decision unit 73a. The imaging failure reason DB 52 is a database that stores the imaging failure reason and the correction information for the imaging failure reason so as to be associated with each other. For example, specifically, the imaging failure reason DB 52 comprises an imaging failure reason/correction information table 52a.

In the imaging failure reason/correction information table 52a, the imaging failure reason and the correction information for the imaging failure reason are described in association with each other. For example, in a case in which the imaging menu is a lateral image of the knee joint corresponding to "knee/flexed position/lateral" (see FIG. 5), an X-ray image 30a that has been successfully captured shows that "the articular surfaces of the medial and lateral condyles of the femur are substantially matched with each other" (Edited by Norihisa Ogawa, "New Illustrated Simple Radiography", 2nd Edition, Kanehara & Co., Ltd., February 2012, p 137). Therefore, for the imaging failure reason and the correction information, in a case in which the articular surfaces of the medial and lateral condyles of the femur are not matched with each other, the imaging failure reason is decided by, for example, the shape of the deviation therebetween and the magnitude of the deviation. Then, the correction information indicates how to incline the object Obj in order to capture the deviation at a desirable position.

Figure 10:
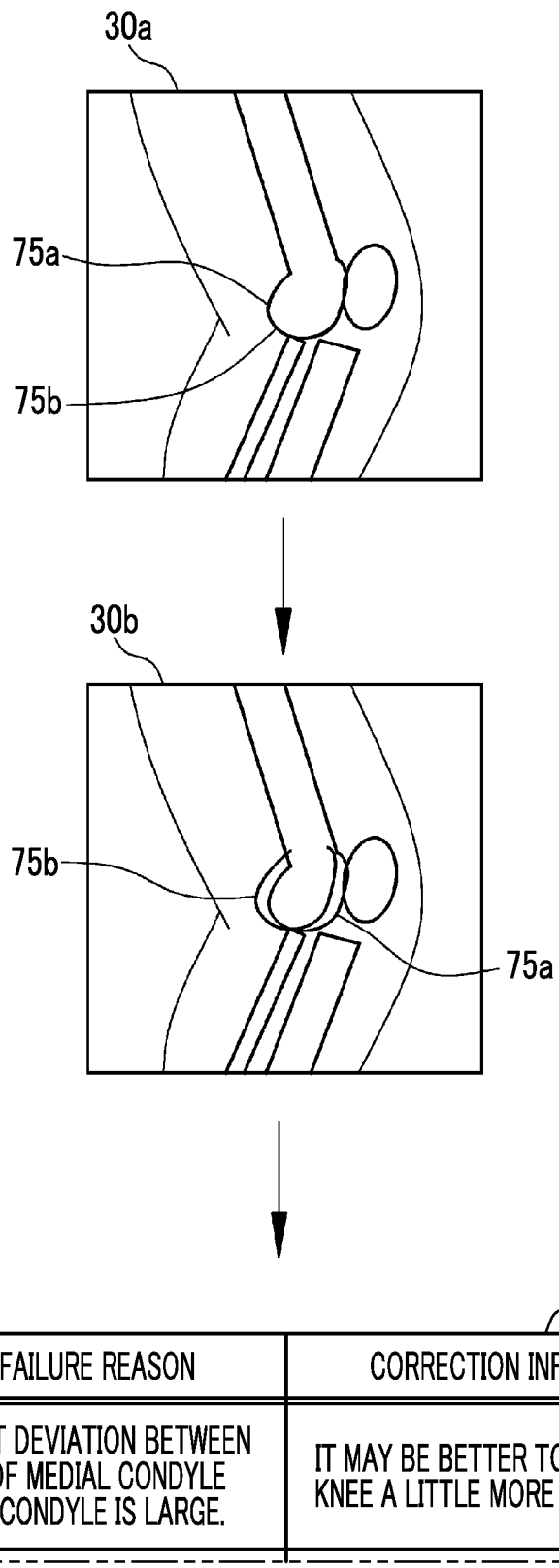
FIG. 10 is a diagram illustrating an imaging failure reason and a correction information.

The imaging failure reason/correction information table 52a will be described in more detail. As illustrated in FIG. 10, in a case in which an X-ray image 30b in which a medial condyle 75b and a lateral condyle 75a of the femur are not matched with each other is obtained, the image processing unit 62 analyzes the X-ray image 30b to recognize, for example, that the distance between the medial condyle 75b and the lateral condyle 75a of the femur is greater than a set threshold value from the contour of the medial condyle 75b of the femur and the contour of the lateral condyle 75a of the femur. Therefore, the image processing unit 62 determines that the X-ray image 30b has failed as the lateral image of the knee joint. In addition, in the X-ray image 30a that has been successfully captured, the contour of the medial condyle 75b of the femur and the contour of the lateral condyle 75a of the femur are matched with each other. Then, the imaging failure reason is decided to be "It seems that the deviation between the peripheries of the medial condyle and the lateral condyle is large." depending on, for example, the position of the contour of the medial condyle 75b of the femur and the contour of the lateral condyle 75a of the femur. According to the imaging failure reason/correction information table 52a, the correction information for the imaging failure reason is "It may be better to rotate the knee a little more internally.". In this way, the imaging failure reason and the correction information for the X-ray image 30 are decided.

In a case in which the correction information is displayed, the operator can perform re-imaging after seeing the correction information. For example, in the recapture of the X-ray image 30b, for the inclination of the thigh with respect to the irradiation surface of the X-rays Ra, the advice that imaging will succeed in a case in which the thigh is inclined a little, for example, about 10 degrees with respect to the irradiation surface of the X-rays Ra in a direction in which the body becomes further away from the irradiation surface of the X-rays Ra and the other conditions are not changed is displayed.

Specifically, the correction information may be any information, such as a still image, a moving image, an illustration, an icon, or an animation, in addition to characters, such as text, as long as it can indicate information including advice for the operator to succeed in re-imaging. In a case in which an image, such as a still image, a moving image, an illustration, an icon, or an animation, is used, it is preferable that the correction information includes a sample image which has been successfully captured and is the past X-ray image having the same portion and/or the same imaging data as the X-ray image 30 determined to be a failure. Further, the correction information may be information obtained by performing, for example, processing for displaying a portion to be changed on the sample image.

Further, the correction information may include the X-ray image 30b determined to be a failure. In addition, the correction information may be information obtained by combining these information items. Specifically, for example, the correction information is an image obtained by superposing an arrow indicating the position of a portion of the object Obj or how to incline on a partial region of the X-ray image 30b determined to be a failure. Further, the correction information may be an image obtained by arranging the X-ray image 30b determined to be a failure and the X-ray image 30a of the same portion which has been successfully captured in parallel. Alternatively, in the case of the animation or the moving image, for example, a deviating line on the X-ray image 30b determined to be a failure may be animated by the image of the object Obj on the X-ray image 30b determined to be a failure and the image of the object Obj on the X-ray image 30a which has been successfully captured such that it gradually moves and is matched with a corresponding line on the X-ray image 30a which has been successfully captured.

Figure 11:
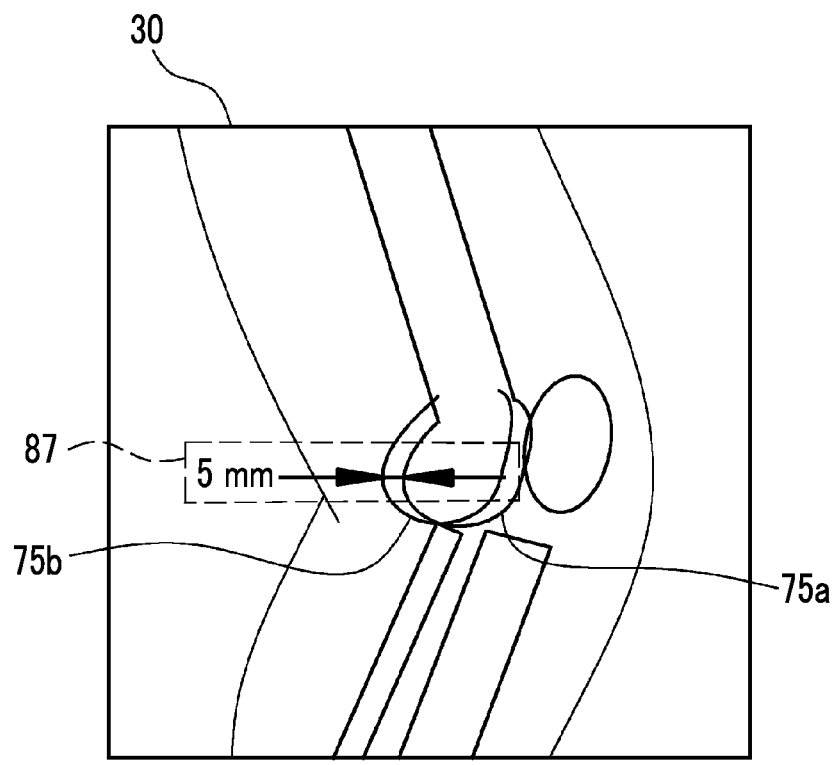
FIG. 11 is a diagram illustrating deviation amount display.

As illustrated in FIG. 11, the deviation amount measurement unit 73b overlays deviation amount information 87, for example, in a case in which the X-ray image 30 is displayed on the display 17 to output the information related to the position where deviation occurs and the amount of deviation. The deviation amount information 87 is the numerical display of the amount of deviation at a portion where the amount of deviation is largest among the positions where the deviation occurs. The amount of deviation is represented by a numerical value of, for example, "5 mm", and the position where the numerical value is measured is represented by, for example, an arrow. This enables the operator to more accurately recognize how much the knee is internally rotated to achieve successful imaging. In addition, the deviation amount information 87 may be set so as not to be displayed in some cases.

The display control unit 64 performs control to display the decided correction information on the display 17. The operator checks the correction information displayed on the display 17 of the console 16 and performs re-imaging. Therefore, the possibility that an imaging failure will occur again is reduced.

As described above, the X-ray imaging system 10 determines an imaging failure on the basis of predetermined criteria and gives advice for reducing the number of re-imaging operations. Therefore, it is possible to reduce unnecessary imaging failures and to reduce the number of re-examinations after an examination.

In addition, in a case in which the X-ray image 30 is determined to be a failure as a result of the analysis by the image processing unit 62, it is possible to notify the operator that the imaging failure has occurred. A notification unit may be any unit as long as it can notify the operator that an imaging failure has occurred. Display, sound, or other notification units can be used. However, units that do not cause anxiety for the patient who is the object Obj are preferable. After imaging, the operator usually checks the X-ray image 30 displayed on the display 17. Therefore, a notification unit for displaying information on the display 17 is preferable. For example, in a case in which the X-ray image 30 is determined to be a failure, the display control unit 64 displays a notification icon on the display 17 to notify that the X-ray image 30b has been determined to be a failure.

Any display method using the display 17 may be used as long as the operator can understand that the X-ray image 30b has been determined to be a failure. For example, the following method is used: the color of the screen of the display 17 is changed; a notification icon for an alert is displayed; or the notification icon is always displayed on the display 17, and the display of the notification icon is changed. In a case in which the operator checks the captured X-ray image 30 after imaging, the operator sees the display 17 and is notified that the captured X-ray image 30 has been determined to be a failure as a result of the analysis by the image processing unit 62.

In addition, in a case in which the image has not been determined to be a failure, the operator may feel that it is unclear whether the image has not been determined to be a failure because the image is being analyzed or whether the image has been determined to be successfully captured due to the time required for analysis. Therefore, during the analysis, information related to the time required for the analysis may be displayed on the display 17. For example, a time bar or the like may be displayed on the display 17 such that it can be determined from the display whether the image is being analyzed or the analysis has ended.

Figure 12:
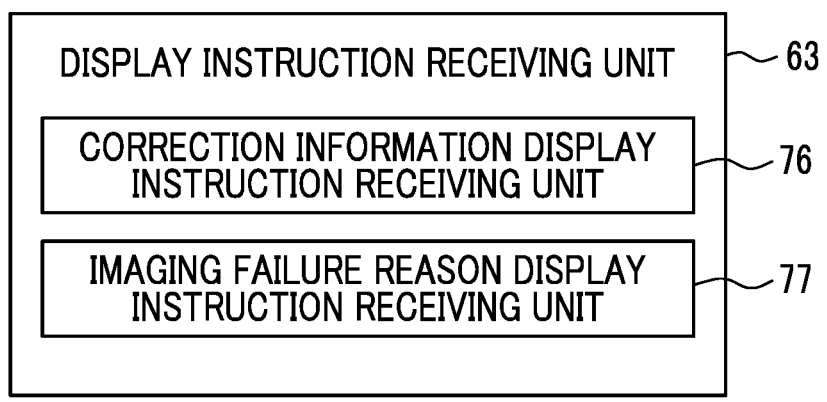
FIG. 12 is a block diagram illustrating the functions of a display instruction receiving unit.

As illustrated in FIG. 12, the display instruction receiving unit 63 comprises a correction information display instruction receiving unit 76 and an imaging failure reason display instruction receiving unit 77. The display instruction receiving unit 63 receives a correction information display instruction or an imaging failure reason display instruction which is an instruction on whether or not to display the correction information or the imaging failure reason on the display 17 and instructs the display control unit 64 on the display of the correction information or the imaging failure reason.

The correction information display instruction receiving unit 76 receives the correction information display instruction on whether or not to display the correction information on the display 17. For example, an examination engineer inputs the correction information display instruction with the input device 18. In a case in which the X-ray image 30 is determined to be a failure, it is possible to determine whether or not to display the correction information in response to the correction information display instruction.

Therefore, for example, in particular, this is combined with the case in which it is notified that the X-ray image 30 has been determined to be a failure. In this case, after the notification, the operator determines whether or not the X-ray image 30 is a failure and then inputs an instruction to display the correction information. Then, the correction information is displayed. In this case, as compared to the case in which the correction information is displayed without an instruction, the operator needs to check the X-ray image 30 and determines whether or not to display the correction information. Therefore, for the determination of the imaging failure on the X-ray image 30, for example, the following is prevented: only the image processing unit 62 determines the imaging failure; or in a case in which the image processing unit 62 does not determine the imaging failure appropriately, the chances of correcting the determination of the imaging failure are reduced.

Similarly, the imaging failure reason display instruction receiving unit 77 receives an imaging failure reason display instruction on whether or not to display the imaging failure reason on the display 17. The operator, such as an examination engineer, inputs the imaging failure reason display instruction with the input device 18. In a case in which the X-ray image 30 is determined to be a failure, it is possible to determine whether or not to display the imaging failure reason in response to the imaging failure reason display instruction. Therefore, as in the case of the correction information display instruction, for the determination of the imaging failure on the X-ray image 30, for example, the following is prevented: only the image processing unit 62 determines the imaging failure; or in a case in which the image processing unit 62 does not determine the imaging failure appropriately, the chances of correcting the determination of the imaging failure are reduced.

Specifically, the correction information display instruction or the imaging failure reason display instruction is input by a simple method such as key input, clicking, or the touch of an icon by, for example, a keyboard or a mouse which is the input device 18 or the touch-panel-type display 17.

The display control unit 64 has a display control function of performing control to display the correction information or the imaging failure reason on the display 17 in response to the instructions received by the correction information display instruction receiving unit 76 and the imaging failure reason display instruction receiving unit 77 of the display instruction receiving unit 63. The correction information display instruction or the imaging failure reason display instruction may be input every time imaging is performed. In addition, in a case in which the instruction is set once, the content of the instruction may be maintained until the next setting.

The display instruction receiving unit 63 is configured as described above. Therefore, for example, the notification icon may be always displayed on the display 17. In a case in which the operator wonders whether to determine an imaging failure after the X-ray image 30 is captured, the operator may click the notification icon to input the correction information display instruction or the imaging failure reason display instruction. Then, the correction information or the imaging failure reason may be displayed.

As described above, in a case in which the imaging failure has occurred, the imaging failure reason and/or the correction information is not automatically displayed, but the operator needs to perform a display instruction operation. Therefore, for example, in a case in which the operator considers that the imaging has succeeded, unnecessary information is not displayed on the display 17. As a result, there is no concern that the operation of checking the X-ray image 30 will be hindered. In addition, in cases other than the case in which the operator determines that an imaging failure has occurred and advice on re-imaging is given and in a case in which the operator wonders whether to determine the imaging failure, the operator inputs an instruction to display the correction information and/or the imaging failure reason obtained by the analysis of the X-ray imaging device 12 to correct the determination criteria of the operator into predetermined criteria. In addition, the operator can confidently determine whether or not the X-ray image 30 is a failure. Further, the operator can check the determination of the imaging failure by the X-ray imaging device 12. Therefore, for example, in a case in which there is a problem in the criteria for the determination of the imaging failure by the X-ray imaging device 12 or in a case in which the determination of the imaging failure is incorrect, it is possible to prevent the determination by the X-ray imaging device 12 from being used as the determination of the operator even though the operator does not actually determine the imaging failure on the X-ray image 30.

Figure 13:
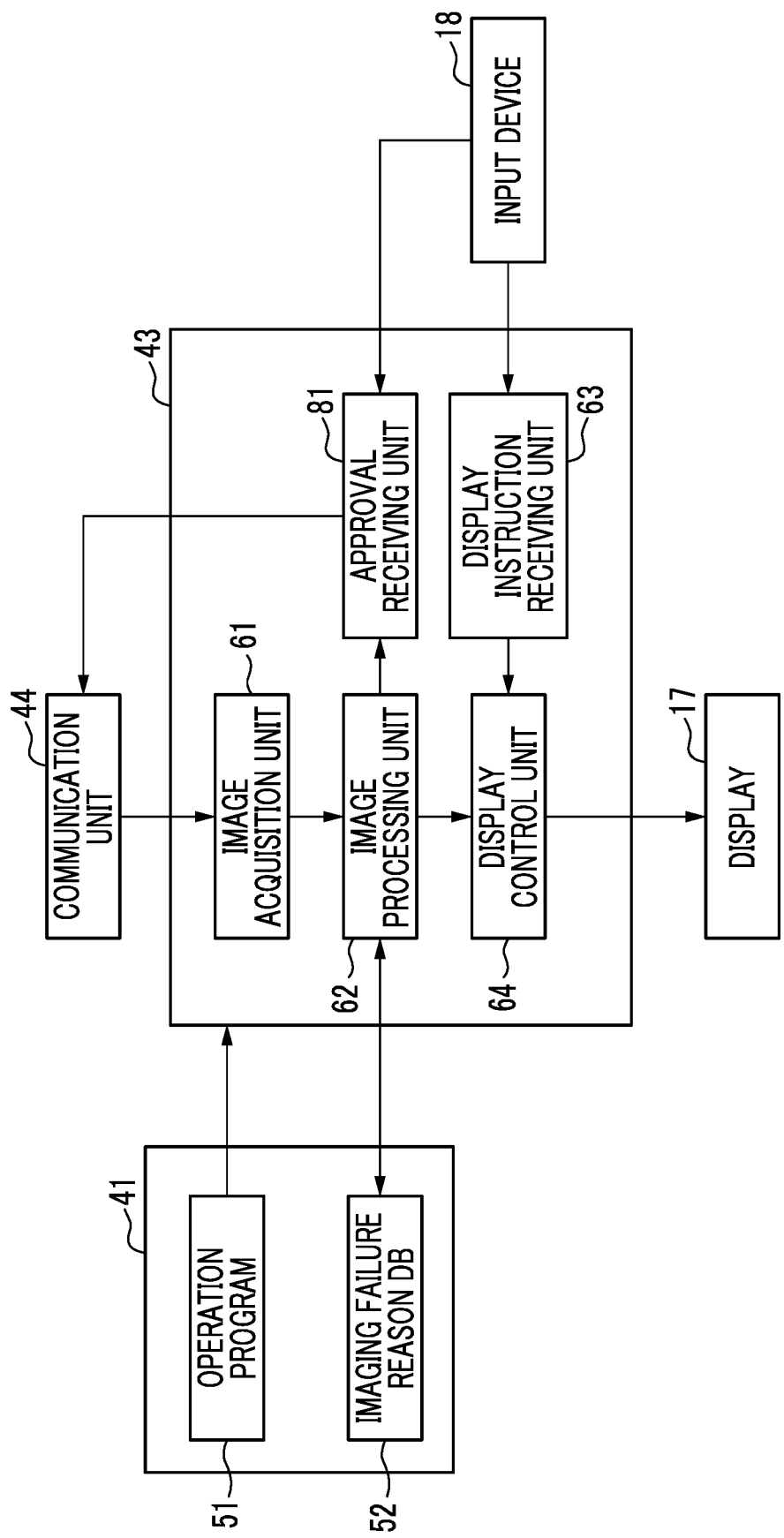
FIG. 13 is a block diagram illustrating the functions of the CPU of the console including an approval receiving unit.

As illustrated in FIG. 13, the X-ray imaging device 12 comprises an approval receiving unit 81. In a case in which the X-ray image 30 is determined to be a failure, the approval receiving unit 81 receives whether or not the operator approves the imaging failure. The operator gives approval using the input device 18. In a case in which the approval receiving unit 81 receives the approval, the approval receiving unit 81 receives the X-ray image 30 and necessary information from the image processing unit 62 and transmits the information to the communication unit 44.

Then, the information is transmitted to, for example, each unit. The information includes, for example, the imaging order and the image file 31.

As a format of the approval, for example, an approval icon and a disapproval icon are displayed on the display 17. In a case in which the operator approves the determination of the imaging failure by the X-ray imaging device 12, the operator clicks the approval icon. In addition, in the following description, the click includes a touch. On the other hand, in a case in which the operator does not approve the determination of the imaging failure, the operator clicks the disapproval icon (see FIG. 19).

In a case in which the approval icon is clicked, the operator determines that the X-ray image 30 determined to be a failure by the X-ray imaging device 12 is a failure. Therefore, in a case in which the approval receiving unit 81 receives the approval from the operator, the same process as that in a case in which a normal imaging failure occurs is performed.

Figure 14:
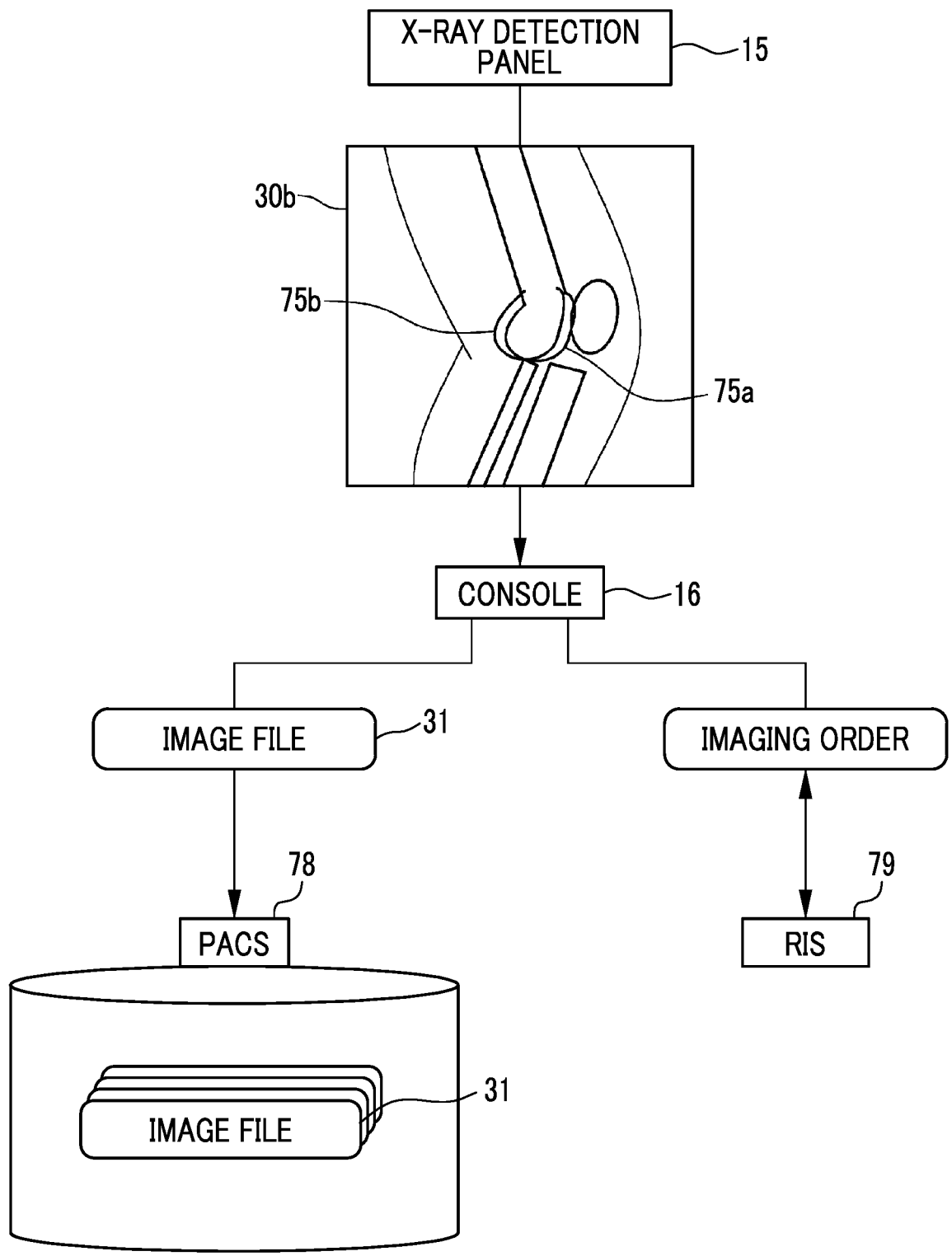
FIG. 14 is a diagram illustrating the transmission of an image file.

As illustrated in FIG. 14, for example, in a case in which the X-ray imaging system 10 including the X-ray imaging device 12 comprises an RIS 79 that manages an imaging order, the approval receiving unit 81 receives the approval of the imaging failure. Then, a re-imaging order is registered in the RIS 79. The content of the re-imaging order is acquired by the information of the imaging order of the approved X-ray image 30 or the information of the image file 31 including the X-ray image 30.

Further, in a case in which the X-ray imaging system 10 including the X-ray imaging device 12 is connected to a PACS 78 that manages radiographic images and information related to the radiographic images, the approval receiving unit 81 receives the approval from the operator. In some cases, the approval receiving unit 81 acquires information from the RIS 79. Then, the approval receiving unit 81 transmits the X-ray image 30 and the information related to the X-ray image 30 to the PACS 78. Specifically, the image file 31 including the X-ray image 30 is automatically registered in the PACS 78. The image file 31 is based on the DICOM standard and is registered in the PACS 78 in the form in which information related to the imaging failure is input by the X-ray imaging system 10.

Further, in a case in which the X-ray imaging system 10 including the X-ray imaging device 12 comprises an imaging failure management device (not illustrated) that manages the X-ray image 30b determined to be a failure and the approval receiving unit 81 receives the approval of the imaging failure of the X-ray image 30, information including the X-ray image 30b and the imaging failure reason for the X-ray image 30b is transmitted to the imaging failure management device.

In addition, the following configuration may be used: in a case in which the determination of the imaging failure is approved, the imaging failure reason and/or the correction information is displayed on the display 17; and the operator clicks the approval icon in a case in which the operator approves all the matters. For example, in a case in which the operator approves that the X-ray image 30 is a failure, but does not approve the imaging failure reason and/or the correction information, the operator clicks the disapproval icon. In this case, the operator may correct a portion in which the imaging failure reason and/or the correction information has been corrected. In a case in which the correction is completed, the operator can click the approval icon to transmit the information approved by the operator to each unit of the RIS and/or the PACS.

In addition, in a case in which the operator does not approve that the X-ray imaging device 12 has determined the X-ray image 30b to be a failure, the operator clicks the disapproval icon. Then, the operator changes that the X-ray image has been determined to be a failure. Further, in this case, the operator writes the reason for changing the determination of the X-ray imaging device 12. Furthermore, the criteria for determining the imaging failure of the image processing unit 62 may be corrected using this reason.

In a case in which the operator clicks the disapproval icon to disapprove the X-ray image 30 determined to be a failure by the image processing unit 62, a screen for selecting whether to cancel the imaging failure, whether to change the imaging failure reason, or whether to change the correction information and for editing the selected item is displayed as described above. In a case in which the imaging failure is canceled, the X-ray image 30 as the image successfully captured and information related to the X-ray image 30 are transmitted to the PACS. Specifically, the image file 31 including the X-ray image 30 is automatically registered in the PACS.

As described above, the approval of the operator makes it possible to automatically perform the operation and procedure in a case in which the operator determines that an imaging failure has occurred with a simple operation of clicking the approval icon. Therefore, it is possible to improve the efficiency of the operation. A case in which the final determination of whether the X-ray image 30 is determined to be a failure or not to be a failure is made is a signal for ending an imaging operation for one imaging order.

Figure 15:
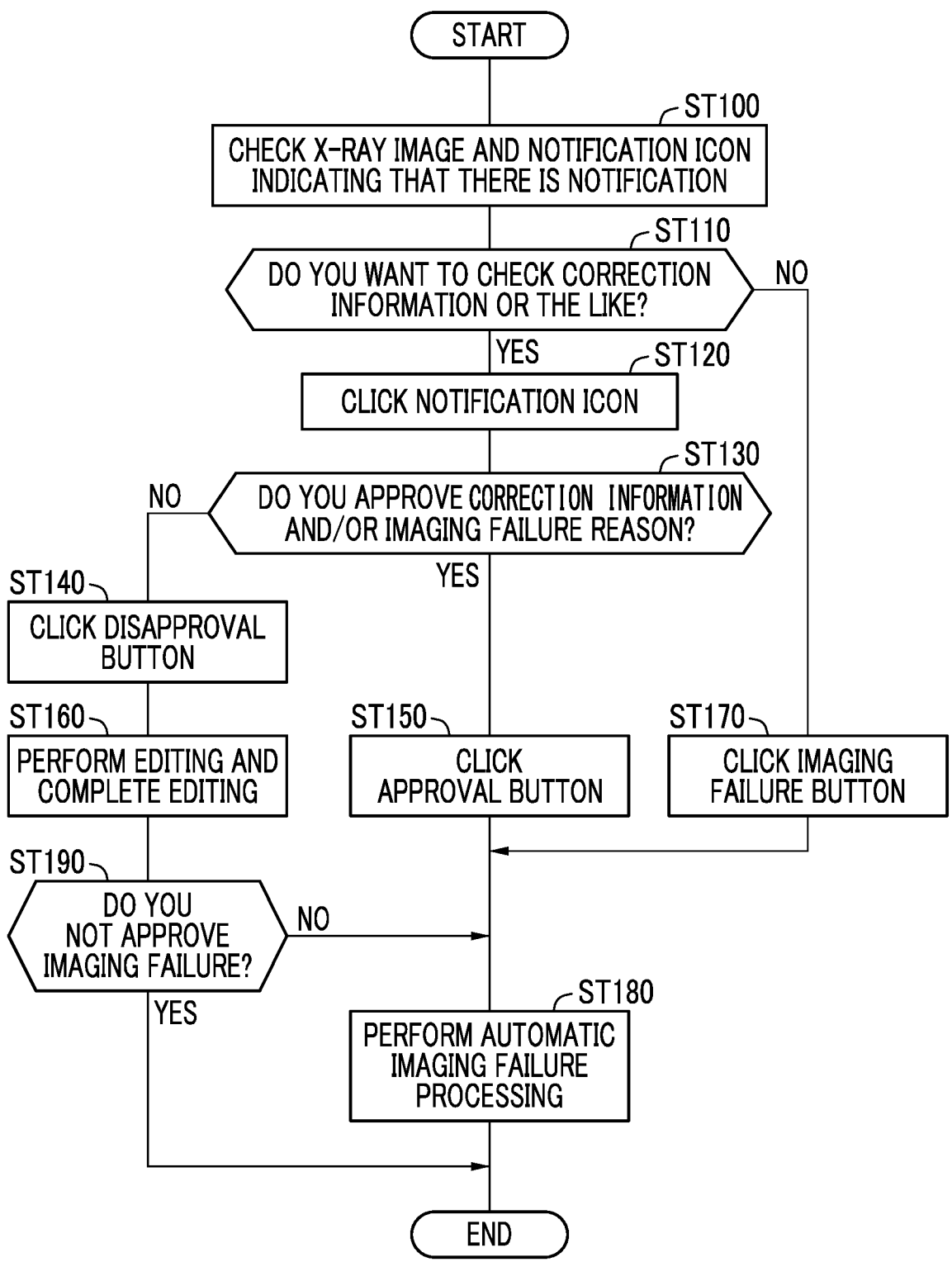
FIG. 15 is a flowchart illustrating the flow of the operation of an operator.

Next, the operation of the above-mentioned configuration will be described with reference to a flowchart illustrated in FIG. 15. First, the operator checks the content of the imaging order 21 on the display 17 and sets a desired imaging menu corresponding to the imaging order 21 through the input device 18. Then, a condition setting signal including the set imaging menu and the irradiation conditions corresponding to the imaging menu is transmitted from the console 16 to the X-ray detection panel 15. After setting the imaging menu, the operator sets the same irradiation conditions as the irradiation conditions corresponding to the set imaging menu in the radiation source control device 14 through the touch panel. Then, the operator starts the relative positioning of the X-ray source 13, the X-ray detection panel 15, and the object Obj.

Figure 16:
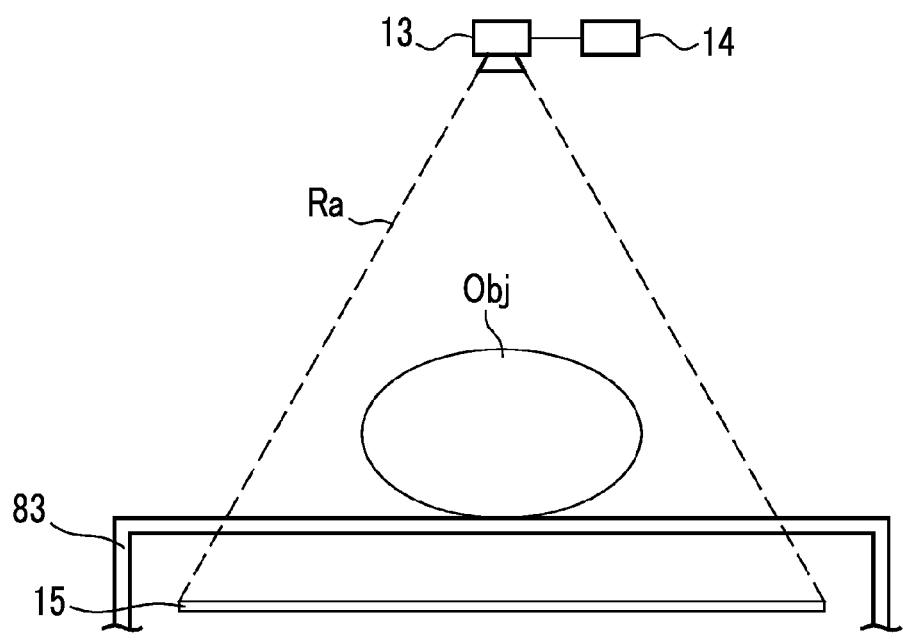
FIG. 16 is a diagram illustrating the capture of an X-ray image.

For example, in a case in which the imaging menu is the capture of the lateral image of the knee joint corresponding to "knee/flexed position/lateral", the operator places a knee portion which is the object Obj on a bed 83 perpendicularly to the X-ray source 13 as illustrated in FIG. 16. The X-ray detection panel 15 is set at a position that faces the X-ray source. In addition, in this case, the operator sets the size of the irradiation opening of the irradiation field limiter, that is, the irradiation field in the radiation source control device 14 through the touch panel. The operator operates the irradiation field display light source to irradiate an electronic cassette with the irradiation field display light. The operator finely adjusts the positions of the X-ray source 13, the X-ray detection panel 15, and the object Obj, using the irradiation field display light as a clue, such that a desired positional relationship is established among the X-ray source 13, the X-ray detection panel 15, and the object Obj.

After positioning, the operator operates the irradiation switch such that the X-ray source 13 generates the X-rays Ra. The front surface of the X-ray detection panel 15 is irradiated with the X-rays Ra which have been emitted from the X-ray source 13 and transmitted through the object. The X-ray detection panel 15 detects the start of the emission of the X-rays Ra with an irradiation start detection function. Then, an irradiation start detection signal is wirelessly transmitted from the X-ray detection panel 15 to the console 16. After detecting the start of the emission of the X-rays Ra, the X-ray detection panel 15 performs a pixel charge accumulation operation and an image reading operation to detect the X-ray image 30. The X-ray image 30 is wirelessly transmitted from the X-ray detection panel 15 to the console 16.

Figure 17:
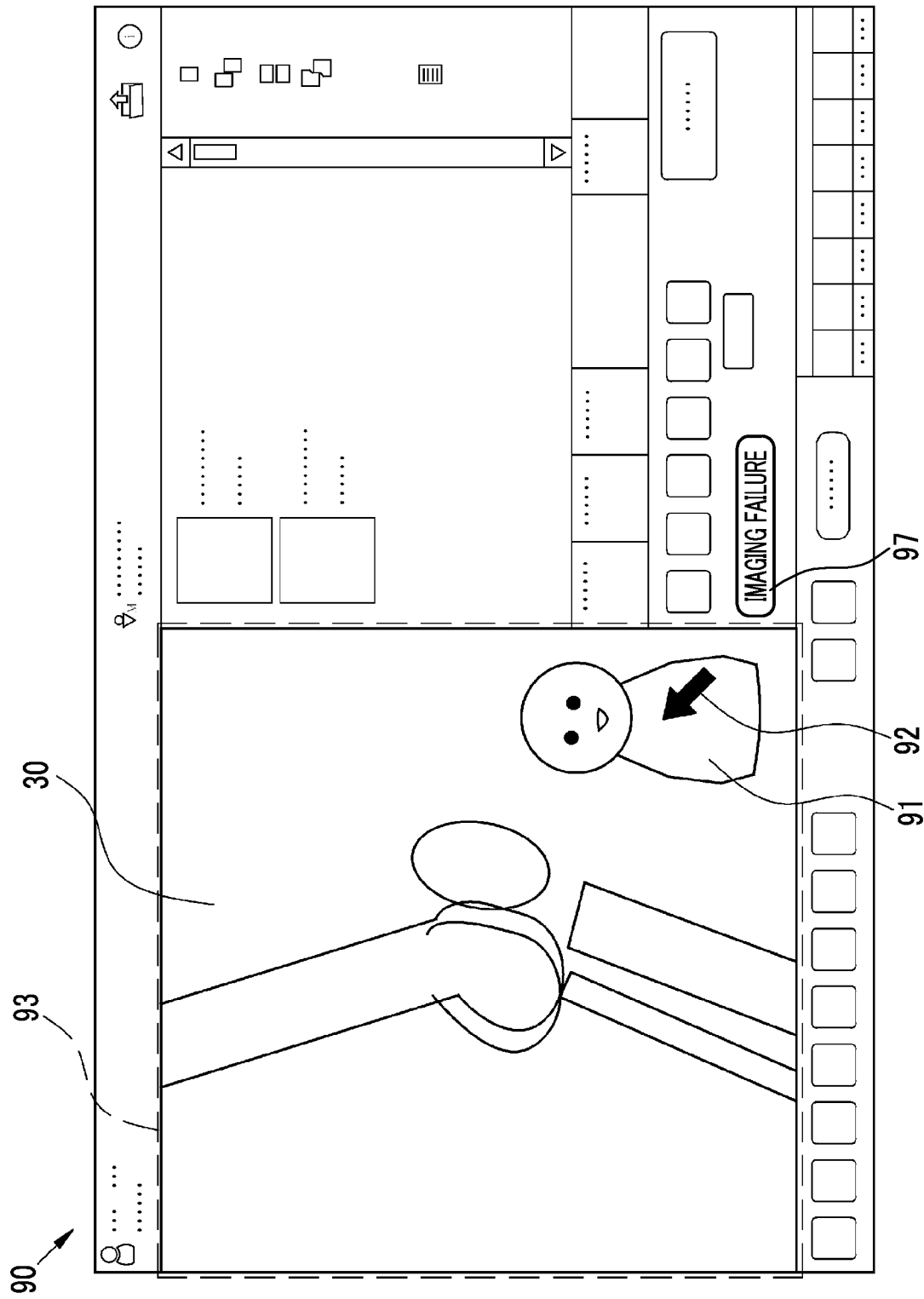
FIG. 17 is a screen diagram illustrating an X-ray imaging system management screen on which a notification screen is displayed.

In a case in which the captured X-ray image 30 is wirelessly transmitted to the console 16, the X-ray image 30 and a notification icon 91 are displayed on an X-ray imaging system management screen 90 of the display 17 as illustrated in FIG. 17. The notification icon 91 can have, for example, the shape of a character. The notification icon 91 is always displayed.

The console 16 receives the X-ray image 30, and the CPU 43 starts the operation of the image acquisition unit 61, the image processing unit 62, the display instruction receiving unit 63, and the display control unit 64 as illustrated in FIG. 7. The image acquisition unit 61 receives the X-ray image 30 and transmits the X-ray image 30 to the image processing unit 62. The image processing unit 62 analyzes the X-ray image 30. As illustrated in FIG. 8, the imaging failure determination unit 71 performs the determination of the imaging failure on the X-ray image 30. The determination is performed using the trained model 72a.

In a case in which the analysis ends and the analysis result indicating that the X-ray image 30 is a failure, the imaging failure reason decision unit 73a decides the imaging failure reason on the basis of the information from the imaging failure determination unit 71 and information, such as the imaging order 21 and/or the image file 31, which is used depending on the situation. The imaging failure reason decision unit 73a decides the correction information corresponding to the imaging failure reason, using the decided reason, the imaging failure reason/correction information table 52a stored in the imaging failure reason DB 52, and the information, such as the imaging order 21 and/or the image file 31, which is used depending on the situation.

Figure 18:
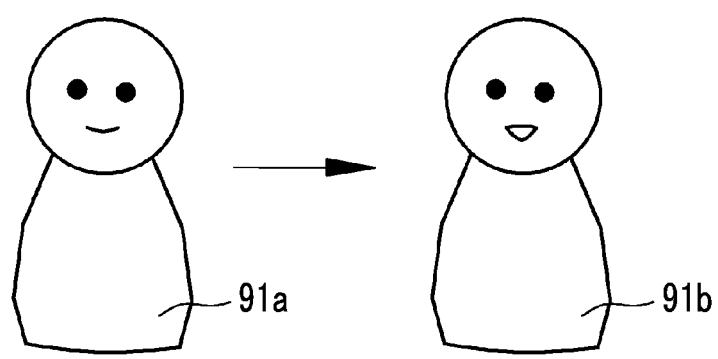
FIG. 18 is a diagram illustrating a change in a notification icon.

The notification icon 91 is displayed on a notification screen 93 of the display 17 while the facial expression of the notification icon 91 is changed in order to notify the operator that the captured X-ray image 30 has been determined to be a failure. That is, as illustrated in FIG. 18, in a case in which the result of the analysis shows that the captured X-ray image is not a failure after X-ray imaging, the notification icon 91 is displayed as a notification icon 91a with a closed mouth which indicates that there is no notification. On the other hand, in a case in which the result of the analysis shows that the captured X-ray image is a failure, the notification icon 91 is displayed as a notification icon 91b with an open mouth which indicates that there is a notification.

Figure 19:
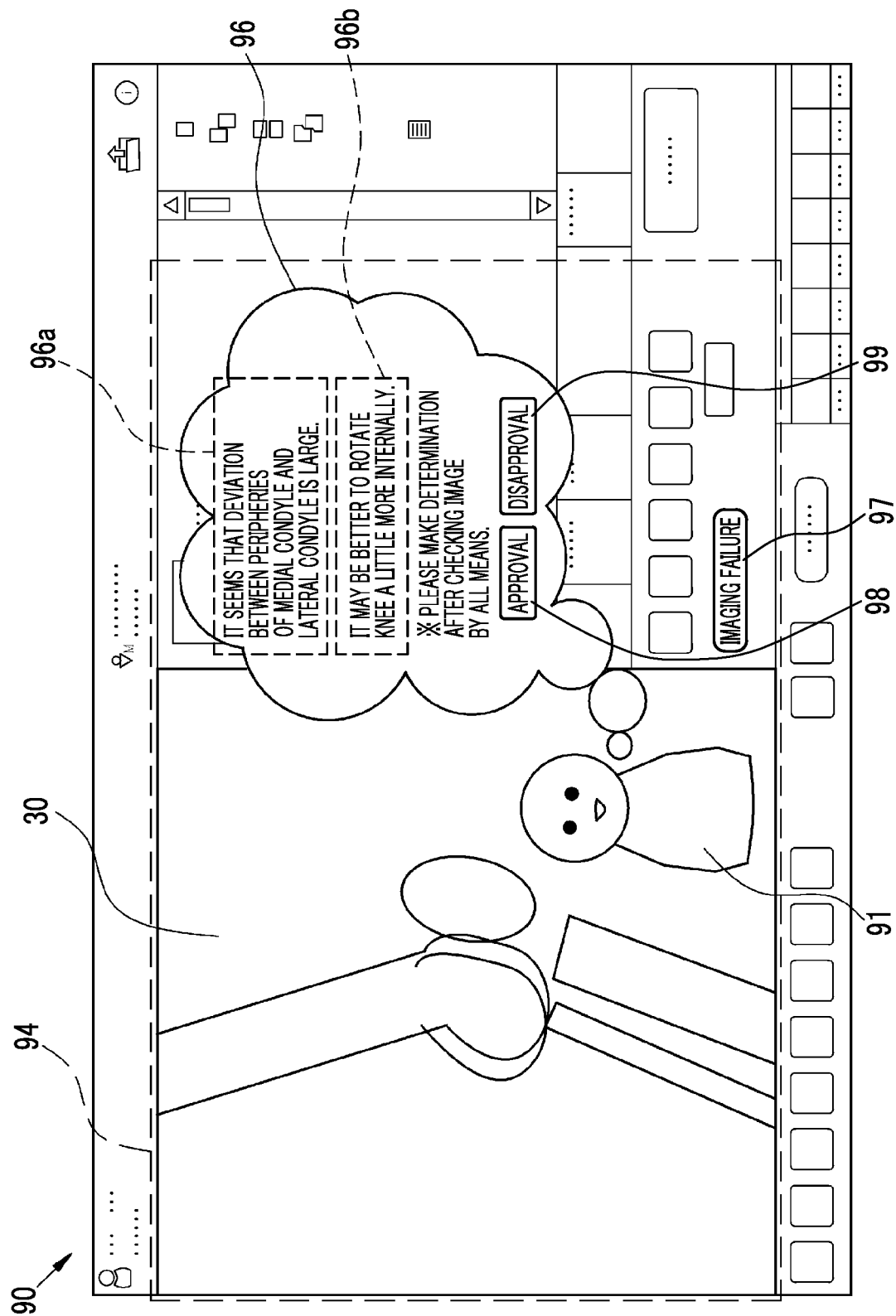
FIG. 19 is a screen diagram illustrating the X-ray imaging system management screen on which a correction information display screen is displayed.
Figure 20:
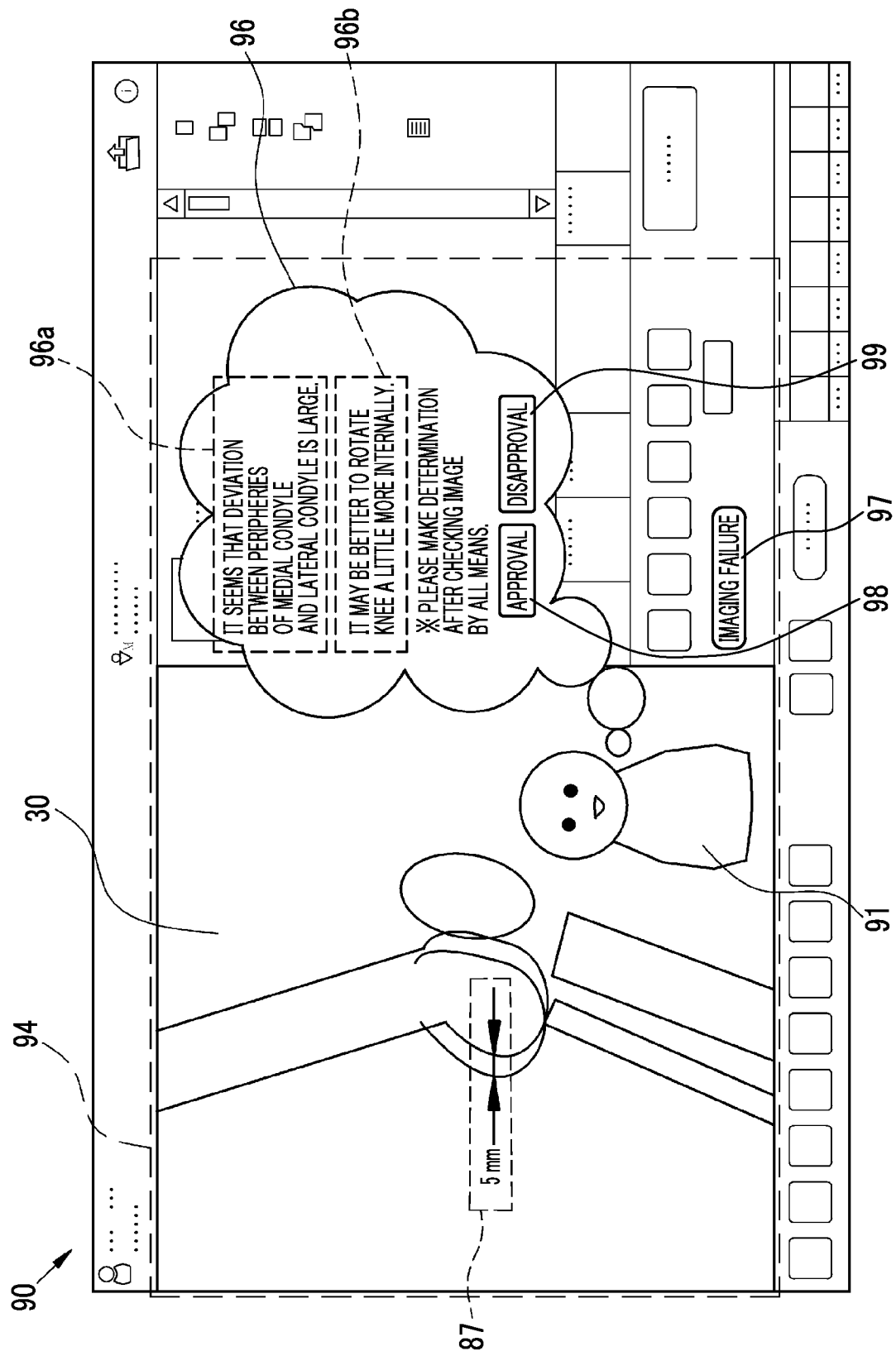
FIG. 20 is a screen diagram illustrating the X-ray imaging system management screen on which the correction information display screen including deviation amount display is displayed.

The operator sees and checks the captured X-ray image 30 on the display 17. Therefore, the operator also sees the notification icon 91 displayed on the display 17 (FIG. 15, Step ST100). In this case, the notification icon 91 is the notification icon 91b indicating that there is a notification. In a case in which the operator wants to check the correction information or the imaging failure reason (YES in Step ST110), the operator moves a cursor 92 on the notification icon 91 and clicks on the notification icon 91 with the mouse or the like (see FIG. 17, Step ST120). As illustrated in FIG. 19, the X-ray imaging system management screen 90 is changed from the notification screen 93 to a correction information display screen 94 by this operation. The correction information display screen 94 includes an imaging failure reason and/or correction information display portion 96. The imaging failure reason and/or correction information display portion 96 includes an imaging failure reason display portion 96*a* and/or a correction information display portion 96*b*, an approval button 98, and a disapproval button 99. In addition, in a case in which the deviation amount information 87 is set to be displayed, the deviation amount information 87 is displayed as illustrated in FIG. 20.

In a case in which the operator determines that the X-ray image 30 displayed on the display 17 is not a failure after checking the content of the display in the imaging failure reason and/or correction information display portion 96 (NO in Step ST130), the operator clicks the disapproval button of the notification icon 91 (Step ST140). Then, it is possible to edit and change the data of the image file 31 input as a failure. As needed, editing to input that the image is not a failure is performed (Step ST160), and the determination that the image is not a failure is input (YES in Step ST190).

On the other hand, in a case in which the X-ray image 30 displayed on the display 17 is determined to be a failure and there is no objection to the content indicated by the imaging failure reason and/or correction information display portion 96 (YES in Step ST130), the operator clicks the approval button 98 of the notification icon 91 (Step ST150). In a case in which the approval button 98 is clicked, imaging failure processing is automatically performed on the X-ray image 30 (Step ST180). On the display 17, the imaging failure reason and/or correction information display portion 96 disappears, and the notification icon 91 is changed to the notification icon 91*a* indicating that there is no notification. Then, the state returns to a standby state before imaging.

Further, in a case in which the X-ray image 30 displayed on the display 17 is determined to be a failure and there is an objection to the content indicated by the imaging failure reason and/or correction information display portion 96 (NO in Step ST130), a button for editing the determination of the imaging failure, the correction information, and the imaging failure reason is displayed by the clicking of the disapproval button by the operator. In a case in which editing is not performed, the editing is completed. In a case in which editing is performed, the operator clicks each editing button to edit the determination of the imaging failure, the correction information, and the imaging failure reason (Step ST160). In a case in which the determination of the imaging failure on the X-ray image 30 is approved (NO in Step ST190), the process proceeds to the imaging failure processing (Step ST180). Then, the determination of the imaging failure by the operator is completed.

In addition, even in a case in which the notification icon 91*b* indicating that there is a notification is displayed and the image processing unit 62 determines that the X-ray image 30 displayed on the display 17 is a failure, the operator may click an imaging failure button 97 (Step ST170) to perform the imaging failure processing according to the operator's determination, without clicking the notification icon 91 to display the correction information (NO in Step ST110). Then, automatic imaging failure processing (Step ST180) is performed. In a case in which the operator performs the imaging failure processing on the X-ray image 30, the notification icon 91 is changed to the notification icon 91*a* indicating that there is no notification, and the state returns to the standby state before imaging.

The imaging failure processing that is automatically performed, for example, after the approval button 98 is clicked or after the imaging failure button 97 is clicked includes, for example, the transmission of data to the imaging failure management device, the registration of an imaging order for re-imaging, and the input of a DICOM file to the corresponding portion. In this case, the approval receiving unit 81 acquires necessary information from the image processing unit 62 and transmits the information to the communication unit 44. The communication unit 44 distributes various kinds of information to each unit. Then, the transmission to the PACS, the RIS, and the imaging failure management device ends. Further, the operation of each of the units 80 to 84 of the CPU 43 is stopped.

In the above-described embodiment, the following various processors are used as the hardware structure of processing units performing various processes such as the image acquisition unit 61, the image processing unit 62, the display control unit 64, the display instruction receiving unit 63, and the approval receiving unit 81. The various processors include, for example, a central processing unit (CPU) which is a general-purpose processor that executes software (programs) to function as various processing units, a programmable logic device (PLD), such as a field programmable gate array (FPGA), that is a processor whose circuit configuration can be changed after manufacture, and a dedicated electric circuit (graphical processing unit: GPU) which is a processor having a dedicated circuit configuration designed to perform various processes.

One processing unit may be configured by one of the various processors or a combination of two or more processors of the same type or different types (for example, a combination of a plurality of FPGAs, a combination of a CPU and an FPGA, or a combination of a CPU and a GPU). Further, a plurality of processing units may be configured by one processor. A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as the hardware structure.

In addition, specifically, the hardware structure of the various processors is an electric circuit (circuitry) obtained by combining circuit elements, such as semiconductor elements.

From the above description, it is possible to understand a method for operating a radiography apparatus according to the following Supplementary Note 1 and a program for operating a radiography apparatus according to Supplementary Note 2.

Supplementary Note 1

There is provided a method for operating a radiography apparatus comprising: a radiation source that generates radiation; a radiography unit that images an object using the radiation; a display that displays a radiographic image obtained by the imaging; and a processor. The processor analyzes the radiographic image to determine the radiographic image, whose capture is determined to have failed, to be a failure and to decide an imaging failure reason, which is a reason for the determination, and correction information for eliminating the imaging failure reason, and displays the correction information on the display.

Supplementary Note 2

There is provided a program for operating an image processing device. The program causes a computer to execute: a radiographic image acquisition function of acquiring a radiographic image that is based on radiation, which has been emitted from a radiation source and transmitted through an object, and is detected by a radiation detection panel; a display function of displaying the radiographic image; an image processing function of analyzing the radiographic image to determine the radiographic image, whose capture is determined to have failed, to be a failure and deciding an imaging failure reason, which is a reason for the determination, and correction information for eliminating the imaging failure reason; and a display control function of displaying the correction information on a display unit.

The invention is not limited to the above-described embodiment and may adopt various configurations without departing from the spirit and scope of the invention. Further, the invention extends to a storage medium that stores a program in addition to the program.

EXPLANATION OF REFERENCES

10: X-ray imaging system
11: X-ray generation device
12: X-ray imaging device
13: X-ray source
14: radiation source control device
15 X-ray detection panel
16: console
17: display
18: input device
21: imaging order
22: menu/condition table
30: X-ray image
30a: X-ray image successfully captured
30b: X-ray image determined to be failure
31: image file
32: accessory information
41: storage device
42: memory
43: CPU
44: communication unit
45: data bus
51: operation program
52: imaging failure reason DB
52a: imaging failure reason/correction information table
61: image acquisition unit
62: image processing unit
63: display instruction receiving unit
64: display control unit
71: imaging failure determination unit
72a: trained model
72b: determination image adjustment unit
73a: imaging failure reason decision unit
73b: deviation amount measurement unit
74: correction Information decision unit
75a: lateral condyle
75b: medial condyle
76: correction information display instruction receiving unit
77: imaging failure reason display instruction receiving unit
78: PACS
79: RIS
81: approval receiving unit
83: bed
85: frame
86: region designation cursor
87: deviation amount information
90: management screen
91: notification icon
91a: notification icon indicating that there is no notification
91b: notification icon indicating that there is notification
92: cursor
93: notification screen
94: correction information display screen
96: imaging failure reason and/or correction information display portion
96a: imaging failure reason display portion
96b: correction information display portion
97: imaging failure button
98: approval button
99: disapproval button
Obj: object
Ra: X-ray
ST100 to ST190: step

What is claimed is:

1. A radiography apparatus comprising:
a radiation source that generates radiation;
a radiography unit that images an object using the radiation;
a display that displays a radiographic image obtained by the imaging; and
a processor configured to:
analyze, by a trained artificial intelligence model, the radiographic image to determine the radiographic image, whose capture is determined by the trained AI model to have failed, to be a failed image by performing an image processing of the failed image to determine whether a distance between two locations of two bones exceed a set threshold, and to decide an imaging failure reason, which is a reason for the determination,
determine correction information for eliminating the imaging failure reason, and
display, on the display, the radiographic image, the correction information associated with the imaging failure reason, a deviation amount information on the radiographic image, a first position of the object from a failed image, and a second position of the object from a successfully captured image, wherein the deviation information overlaps with the first position of the object or the second position of the object to allow an operator to adjust the object and to perform a re-imaging in response to adjusting the object.

2. The radiography apparatus according to claim 1, wherein the processor is configured to receive a correction information display instruction on whether or not to display the correction information on the display before displaying the correction information on the display in response to the correction information display instruction.

3. The radiography apparatus according to claim 2, wherein the processor is configured to receive an imaging failure reason display instruction on whether or not to display the imaging failure reason on the display before displaying the imaging failure reason on the display in response to the imaging failure reason display instruction.

4. The radiography apparatus according to claim 1, wherein the processor is configured to learn a radiographic image acquired in the past in advance and performs the analysis using a trained model that performs a determination of the correction information for eliminating the imaging failure reason.

5. The radiography apparatus according to claim 1, wherein the processor is configured to access an imaging failure reason database, in which the imaging failure reason and the correction information have been registered in advance in association with each other, to decide the correction information for eliminating the imaging failure reason.

6. The radiography apparatus according to claim 1, wherein the correction information is information including at least one of a character, a still image, or a moving image.

7. The radiography apparatus according to claim 6, wherein the correction information is information including a sample image that has been successfully captured with respect to the radiographic image determined to be the failed image.

8. The radiography apparatus according to claim 1, wherein, in a case in which the radiographic image is determined to be the failed image, the processor is configured to receive whether or not a user approves the failed image.

9. A radiography system comprising:
the radiography apparatus according to claim 1,
wherein the radiography system is connected to a radiology information system that manages an imaging order.

10. The radiography system according to claim 9, wherein the radiography system is connected to a picture archiving and communication system that stores the radiographic image and information related to the radiographic image.

11. The radiography system according to claim 9, wherein, in a case in which the radiographic image is determined to be the failed image, the processor is configured to receive whether or not a user approves the failure, and wherein, in a case in which the processor receives the approval of an imaging failure for the radiographic image, the radiology information system registers a re-imaging order for the radiographic image approved as the failed image.

12. The radiography system according to claim 9, wherein, in a case in which the radiographic image is determined to be the failed image, the processor is configured to receive whether or not a user approves an imaging failure for the radiographic image, and wherein the radiography system further comprises an imaging failure management device that receives information including the radiographic image and the imaging failure reason in a case in which the processor has received the approval of the imaging failure for the radiographic image.

13. The radiography system according to claim 10, wherein, in a case in which the radiographic image is determined to be the failed image, the processor is configured to receive whether or not a user approves an imaging failure for the radiographic image, and
wherein, in a case in which the processor has received the approval of the imaging failure for the radiographic image, the picture archiving and communication system is configured to receive the radiographic image and the information related to the radiographic image.

\* \* \* \* \*